(12) United States Patent
Fiedler

(10) Patent No.: US 8,976,498 B2
(45) Date of Patent: Mar. 10, 2015

(54) FIELD DEVICE FOR DETERMINING AND/OR MONITORING A PHYSICAL OR CHEMICAL PROCESS VARIABLE

(75) Inventor: Marc Fiedler, Reinach (CH)

(73) Assignee: Endress + Hauser Process Solutions AG, Reinach (CH)

(*) Notice: Subject to any disclaimer, the term of this patent is extended or adjusted under 35 U.S.C. 154(b) by 247 days.

(21) Appl. No.: 13/139,793

(22) PCT Filed: Nov. 20, 2009

(86) PCT No.: PCT/EP2009/065531
§ 371 (c)(1),
(2), (4) Date: Jun. 15, 2011

(87) PCT Pub. No.: WO2010/069708
PCT Pub. Date: Jun. 24, 2010

(65) Prior Publication Data
US 2011/0249367 A1 Oct. 13, 2011

(30) Foreign Application Priority Data
Dec. 18, 2008 (DE) .......................... 10 2008 054 883

(51) Int. Cl.
*H02H 3/24* (2006.01)
*G06F 1/30* (2006.01)
*H02H 7/00* (2006.01)
*H02H 9/00* (2006.01)
*H02J 7/00* (2006.01)
*H02J 7/14* (2006.01)

(52) U.S. Cl.
CPC . *G06F 1/305* (2013.01); *G06F 1/30* (2013.01)
USPC ................ 361/92; 361/18; 320/126; 320/132

(58) Field of Classification Search
USPC ...................................... 361/92, 18
See application file for complete search history.

(56) References Cited

U.S. PATENT DOCUMENTS

| 5,604,708 | A | 2/1997 | Helms |
| 5,744,876 | A * | 4/1998 | Fangio ........................... 307/66 |
| 6,396,762 | B2 | 5/2002 | Mori |
| 8,248,743 | B2 * | 8/2012 | Priel et al. ........................ 361/79 |
| 2008/0012570 | A1 | 1/2008 | Bucur |
| 2009/0027819 | A1 | 1/2009 | Priel |

FOREIGN PATENT DOCUMENTS

| DE | 298 21 808 U1 | 2/2000 |
| DE | 10 2006 062 603 A1 | 7/2008 |
| EP | 1 933 116 A2 | 6/2008 |
| WO | WO 2006/087596 A1 | 8/2006 |

OTHER PUBLICATIONS

Machine translation of EP 1933116 A2; Siemens AG; Joergensen, Erik; Jun. 2008.*
German Search Report.
International Search Report.
English translation of the IPR.

* cited by examiner

*Primary Examiner* — Thienvu Tran
*Assistant Examiner* — Lucy Thomas
(74) *Attorney, Agent, or Firm* — Bacon & Thomas, PLLC

(57) ABSTRACT

A field device for determining and/or monitoring a physical or chemical, process variable in automation technology. The field device comprises: at least one microcontroller; a supply unit of limited capacity as primary voltage supply; and a detection circuit, which signals the microcontroller of a failure of the supply unit so early by means of a detection signal that sufficient time is available to take suitable safety measures, in order to avoid loss of data. The detection circuit is so embodied that a reference voltage required for detection of a voltage decline of the supply unit has an almost constant offset from the supply voltage of the supply unit and adjusts to the supply voltage, until the detection circuit, in the case of an abrupt subceeding of the reference voltage, or an abrupt voltage decline of the supply voltage, sends a detection signal to the microcontroller.

14 Claims, 2 Drawing Sheets

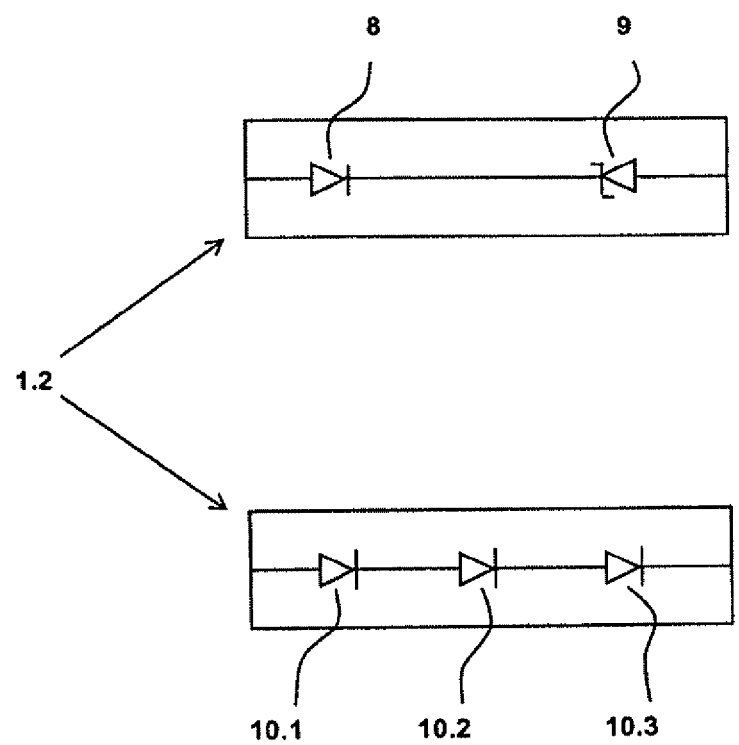

FIELD DEVICE FOR DETERMINING AND/OR MONITORING A PHYSICAL OR CHEMICAL PROCESS VARIABLE

TECHNICAL FIELD

The invention relates to a field device for determining and/or monitoring a physical or chemical, process variable in automation-technology. The field device includes: at least one microcontroller; and a supply unit of limited capacity as a primary voltage supply for the microcontroller. The supply unit of limited capacity comprises a single use battery, a fuel cell or a rechargeable battery.

BACKGROUND DISCUSSION

Field devices serving for registering and/or influencing process variables are often applied in process automation technology as well as in manufacturing automation technology. Serving for registering process variables are measuring devices having at least one sensor and one measurement transmitter. For example, the measuring devices can be fill level measuring devices, flow measuring devices, pressure- and temperature measuring devices, pH-redox potential measuring devices, conductivity measuring devices, etc., which register the corresponding process variables, fill level, flow, pressure, temperature, pH-value, or conductivity. Serving for influencing process variables are actuators, such as, for example, valves or pumps, via which the flow of a liquid in a section of pipeline, or the fill level in a container, can be changed.

Field devices are, in principle, all devices, which are applied near to the process and deliver or process process relevant information. Besides the earlier named measuring devices/sensors and actuators, also referred to as field devices are generally units, such as remote I/Os, gateways, linking devices and wireless adapters, which are directly connected to a fieldbus and serve for communication with superordinated units. A large number of such field devices are produced and sold by the Endress+Hauser group of companies.

In modern industrial plants, field devices are, as a rule, connected via fieldbus systems (systems such as e.g. Profi-Bus®, Foundation Fieldbus®, HART®, etc.) with superordinated units. Normally, the superordinated units are control systems, or control units, such as, for example, a PLC (programmable logic controller). The superordinated units serve, among other things, for process control, process visualizing, process monitoring, as well as for start-up of the field devices. The measured values registered by the field devices, especially sensors, are transmitted via the connected bus system to one or, in given cases, also a number of superordinated unit(s). Along with that, also data transmission is required from the superordinated unit via the bus system to the field devices; this serves especially for configuring and parameterizing of field devices or for diagnostic purposes. In general, the field device is serviced via the bus system from the superordinated unit.

Besides hardwire data transmission between the field devices and the superordinated unit, there is also the opportunity for wireless data transmission. For implementing wireless data transmission, field devices are embodied as radio-field devices, for example. These have, as a rule, a radio unit and a power supply unit as integral components. In such case, the radio unit and the supply unit can be provided in the field device itself or in a radio module connected durably to the field device. The supply unit enables an autarkic energy supply of the field device.

Alternatively, field devices without radio units—thus the base installed in the field today—are modified into radio field devices by the coupling of a wireless adapter, which has a radio unit.

In the case of autarkic field devices, which are controlled via a microcontroller, it is usual to provide a circuit, which rapidly and reliably detects failure of the supply voltage of the supply unit. In this way, the microcontroller has the opportunity to store important parameters, before also a secondary supply unit is lost. The secondary supply unit is usually an energy storer, which can still supply the circuit components of the field device for a limited time with voltage following failure of the supply unit. Known circuit variants for the detection of a so-called "Pre-Power-Fail" include resistive voltage dividers or solutions in the form of integrated circuits, which, most often, scale the supply voltage to a voltage value detectable by the microcontroller and so make the failure measurable.

Often, microcontrollers/CPUs apply Schmitt-trigger stages on their signal inputs. If such a signal input is used, smaller fluctuations, which result, in given cases, from the scaling of the supply voltage by means of voltage dividers, can be measured only inaccurately. On top of this come, most often, also tolerances of the Schmitt trigger switching levels. More exact and therewith reliable is the early detection of a failure of the supply voltage by means of a comparator input; however, this solution is unfavorable as regards energy consumption.

Special disadvantages of the scaling of the supply voltage become evident in the case of single use battery operated devices, thus in the case of devices with limited capacity: With sinking battery voltage, also the voltage on the detection input becomes smaller. Therefore, the setting of the detection threshold must assume a lowest battery voltage. This, in turn, causes a small difference between the "OK"- and the "Bad"-(fail) signal levels. As a result thereof, this type of detection is very disturbance sensitive relative to in-coupling onto the signal lines.

The detection of a Pre-Power-Fail via a resistive voltage divider or also via conventional integrated circuits requires relatively much energy, with energy being very costly, especially in the case of single use battery operated devices. The lower ohmically the divider is designed, the higher is the lost electrical current; the higher ohmically the divider is designed, the more disturbance susceptible is the circuit as regards in-couplings.

SUMMARY OF THE INVENTION

An object of the invention is to detect failure of the primary voltage supply energy savingly, safely and disturbance insensitively.

The object is achieved by features including that a detection circuit is provided, which signals the microcontroller of a failure of the supply unit so early by means of a detection signal that sufficient time is available to take suitable safety measures, in order to to avoid loss of data, wherein the detection signal of the detection circuit for a voltage drop off of the supply voltage is adjustable via a circuit portion to an at least approximately constant value and wherein the detection circuit is so embodied, that a reference voltage required for producing a detection signal has an almost constant offset from the supply voltage and adjusts over a predeterminable period of time to the supply voltage provided by the supply unit, and that, upon the subceeding of this predetermined reference voltage, a detection signal is output to the microcontroller.

According to the invention, the reference voltage is adjustable and has a constant offset from the supply voltage provided from a supply unit of limited capacity. For example, the supply voltage is a single use battery voltage. Here, in the case of aging-related, most often, very slow sinking of the battery voltage, also the reference voltage becomes correspondingly smaller. Thus, the switching threshold of the detection circuit, which corresponds to the reference voltage, moves with the battery voltage. Therefore, the response of the detection circuit is broadly independent of the state of the single use battery, respectively, the supply unit. The separation of the "OK"- and the "Bad"-(fail) signal levels, e.g the offset of the supply voltage from the reference voltage, is adjustable and constant in normal operation. A great advantage of the solution of the invention is low energy consumption compared with known solutions.

Although the detection circuit of the invention has been so far described in connection with a field device, it can be applied generally in connection with any devices fed from a supply unit of limited capacity.

An advantageous embodiment of the field device of the invention provides a voltage converter, which is connected between the supply unit, which provides a primary supply voltage, and the microcontroller, wherein the voltage converter converts the primary supply voltage into a secondary supply voltage matched to the microcontroller.

Furthermore, it is provided, that a first energy storer is connected in parallel with the supply unit or the voltage converter. In the case of failure of the supply unit, the first energy storer provides the microcontroller with sufficient energy that it can undertake suitable safety measures, in order to avoid loss of data. The stored energy is so dimensioned, for example, that the microcontroller can still store unstored data.

Moreover, a further development of the field device provides that, in series with the supply unit or in series with the voltage converter, a diode is arranged in blocking direction. For the case, in which the energy supply unit is lost, the diode blocks electrical current flow from the first energy storer toward the voltage converter and, respectively, toward the supply unit.

Preferably, the circuit portion is so designed that, on the one hand, it produces an at least approximately constant voltage drop and, on the other hand, it suppresses electrical current flow toward the supply unit. The circuit portion comprises at least one diode, or a number of diodes connected in series. Alternatively, the circuit portion comprises a series circuit composed of one diode in flow direction and one Zener diode in blocking direction.

An advantageous embodiment provides that a second energy storer is connected in parallel after the circuit portion. In the normal case, the second energy storer is charged to a predetermined potential (B), wherein the potential (B), relative to the potential (A) on the input of the circuit portion, is lessened by the voltage drop of the circuit portion.

In order to assure that, in normal operation, the matching of the switching threshold (=reference voltage) to the supply voltage occurs quickly enough, it is provided that a resistor is connected parallel to the second energy storer.

Moreover, it is provided in connection with the field device of the invention, that, in series with the circuit portion, a switch element is arranged, which is so operated that, in the case of failure of the energy supply unit, it automatically sends a signal to the microcontroller, which tells the microcontroller of the failure of the supply unit.

Preferably, the switch element is a p-conductive transistor with gate, drain and source, which, in the normal case, blocks electrical current flow, when, thus, there is on the gate the potential A and on the source the potential B and potential A is greater than potential B—thus a p-conductive, field effect transistor. Likewise, however, also a suitable p-conducting bipolar transistor can be used.

In the case of use of a field effect transistor, such is so embodied that it becomes conductive and indicates to the microcontroller by a detection signal the failure of the supply unit, as soon as, as a result of the failure of the supply unit, the potential A on the gate becomes smaller than the potential B on the source.

Advantageously, moreover, there is connected to the drain of the transistor a Zener diode in blocking direction relative to ground, for reducing the signal sent to the microcontroller to a limit value within the specification of the microcontroller. Thus, damaging of the microcontroller is prevented.

BRIEF DESCRIPTION OF THE DRAWINGS

The invention will now be explained in greater detail based on the appended drawing, the figures of which show as follows:

FIG. 2 is a first form of embodiment of the circuit portion; and

FIG. 3 is a second form of embodiment of the circuit portion.

DETAILED DISCUSSION IN CONJUNCTION WITH THE DRAWINGS

Figure 1:
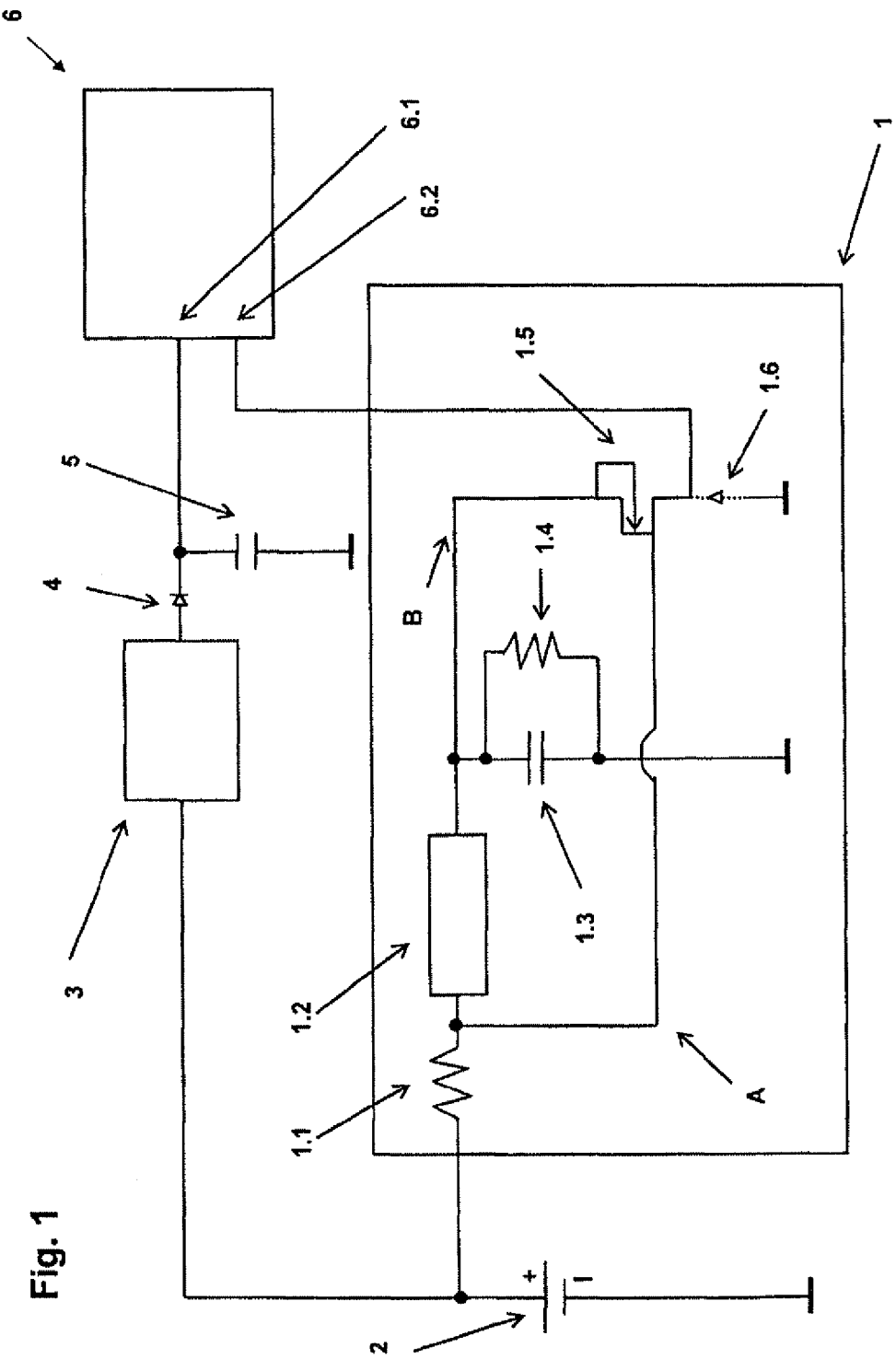
FIG. 1 is an advantageous embodiment of the detection circuit of the invention.

FIG. 1 shows the components 2, 3, 4, 5 needed for a single use battery operated field device, along with microcontroller 6 and detection circuit 1. The detection circuit 1 can, of course, also be associated with a radio adapter, a so-called Local Wireless Adapter. Field device 7 is a device as described in detail in the introduction of the description of the present patent application.

Field device 7 is fed by the primary supply unit 2, which is, preferably, a single use battery. This feeds the voltage converter 3, which, in turn, supplies the microcontroller 6 with voltage.

The capacitance 5 serves as energy storer and assures as buffer in the case of failure of the primary supply unit 2 that the microcontroller 6 has still sufficient energy available, in order to execute suitable measures for saving data still not stored. Diode 4 prevents discharge of the first energy storer 5 (which is usually a capacitor) through the voltage converter 3. The interposing of a diode 4 is, however, not necessary for all voltage converters 3, so that the diode 4 also can, in given cases, be omitted.

The detection circuit 1 is composed, in the illustrated case, of a resistor 1.1, a circuit portion 1.2, a second energy storer 1.3 with resistor 1.4 connected in parallel, a switch element 1.5 and a Zener diode 1.6. Optional in the case of this circuit are the resistor 1.1, the resistor 1.4 and the Zener diode 1.6. Thus resistor 1.1 serves, for example, in the case of use of the field device 7 in an explosion endangered region, to limit the available energy such that the required Ex protection conditions are satisfied. The resistor 1.4 connected in parallel with the second energy storer 1.3 is so dimensioned, that the self discharging of the second energy storer 1.3 can occur more quickly and that the reference voltage can thus match faster a falling off of the supply voltage, to the extent that this should not be indicated as failure. Furthermore, the Zener diode 1.6 limits the level of the detection signal, which is sent to the microcontroller 6 in the case of failure of the supply unit 2, to a limit value within the specification of the microcontroller 6. If the level of the detection signal as such already lies within the specification, then the Zener diode 1.6 can be omitted.

Essential components of the detection circuit 1 are, thus, the circuit portion 1.2, the second energy storer 1.3 and the switch element 1.5. Circuit portion 1.2 produces a constant voltage drop coupled with simultaneous blocking of electrical current toward the supply unit 2. Via e.g. the number, or type, of the diodes, the desired voltage drop is adjustable. As shown in FIG. 2 and FIG. 3, circuit portion 1.2 can comprise a diode 8 (e.g. a Si diode) connected in electrical current flow direction and a Zener diode 9 connected thereafter, wherein the Zener diode 9 is operated in the electrical current blocking direction (FIG. 2). Alternatively, circuit portion 1.2 can comprise a diode 10.1, or a plurality of diodes (Si diodes) 10.1, 10.2, 10.3, which are operated in the electrical current flow direction (FIG. 3). The approximately constant voltage drop results there essentially from the sum of the forward voltage drops of the diodes 10.1, 10.2, 10.3, e.g. Si diodes (FIG. 3), or from the Zener voltage of the Zener diode 9 summed with the forward voltage of diode 8 (Si diode). Which variant is used depends on the required voltage drop. For larger voltage drops, the variant containing diode 8 and Zener diode 9 (FIG. 2) is expedient.

Via the optional resistor 1.1, which serves for limiting the input current, and the circuit portion 1.2, a capacitance 1.3 is charged to the potential B. After the charging process, the potential B is smaller than the potential A on the resistor 1.1 by the voltage drop of the circuit portion 1.2. The potential A corresponds then, for instance, to the supply voltage of the supply unit 2, since (almost) no electrical current flows. Especially, the circuit can be so dimensioned that only leakage currents of the capacitance 1.3 occur as energy loss. Therefore, the energy consumption of the detection circuit is almost zero.

If the supply voltage of the supply unit 2, e.g the single use battery, decreases slowly, e.g. due to aging, then also the potentials A and B lessen. In such case, the potential B, due to the self discharging of the capacitance 1.3, automatically becomes smaller to retain the, at any time, constant remaining voltage difference of the circuit portion 1.2. As already stated, when required, the self discharging can be increased by inserting the resistor 1.4. Thus, it is possible to optimize the reaction speed of the detection circuit 1.

Switch element 1.5 is, in the illustrated case, a P-conductive, field effect transistor (PFET) 1.5, on whose gate G lies the potential A and on whose source S the potential B. The PFET 1.5 blocks, i.e. is non conductive, when potential A is greater than potential B. As a result, there lies on the drain D, which is connected with the detection input 6.2 of the microcontroller 6, no voltage.

If the primary supply unit 2 suddenly fails, then the potential A falls relatively rapidly to zero, because of the still connected consumer, e.g. the converter 3. The circuit portion 1.2 prevents, by its now blocking, one or more diodes, that also the potential B falls to zero. Potential B lessens only very slowly due to the self discharging of the capacitance 1.3, or, as the case may be, the capacitance 1.3 and the resistance 1.4 connected in parallel. Thus, potential A in the case of failure of the supply unit 2 is much smaller than potential B. As a result thereof, the circuit element 1.5, e.g the PFET, becomes conductive.

On the detection input 6.2 of the microcontroller 6 lies the voltage of the first energy storer 1.3, which, in given cases, is limited by the Zener diode 1.6. This limiting limits the input voltage to the microcontroller 6 to the max. allowable input voltage of the microcontroller 6. The resulting voltage level, which corresponds to the level of the reference voltage, is sufficiently large, that the microcontroller 6 safely a detects a positive pulse, or a positive flank, and can react to this "Pre-Power-Fail". The reaction can be, for example, the triggering of an interrupt, which starts a safety routine, in order to write important data and parameters into a non-volatile memory.

The invention claimed is:
1. A field device for determining and/or monitoring a physical or chemical, process variable in automation technology, comprising:
   at least one microcontroller;
   a supply unit of limited capacity as a primary voltage supply providing a supply voltage; and
   a detection circuit, which signals said at least one microcontroller of a failure of said supply-unit so early by means of a detection signal that sufficient time is available to take suitable safety measures, in order to avoid loss of data, wherein:
   said detection circuit is so embodied that a reference voltage which serves as a switching threshold required for detection of a voltage decline of said supply unit exhibits a predetermined offset from said supply voltage and in case of declining of said supply voltage the switching threshold becomes correspondingly smaller, and said predetermined offset from the supply voltage remains constant,
   and in the case said supply voltage abruptly subceeds said reference voltage, said detection circuit sends said detection signal to said at least one microcontroller.
2. The field device as claimed in claim 1, further comprising:
   a voltage converter between said supply unit and said at least one microcontroller, wherein:
   said voltage converter converts a primary voltage supplied by said supply unit into a secondary supply voltage matched to said at least one microcontroller.
3. The field device as claimed in claim 1, further comprising:
   a first energy storer connected in parallel after said supply unit or after said voltage converter, which, upon failure of said supply unit, provides said at least one microcontroller with sufficient energy that it can take suitable safety measures, in order to avoid loss of data.
4. The field device as claimed in claim 3, wherein:
   arranged in blocking direction in series with said supply unit or in series with said voltage converter is a diode, which, for the case, in which said energy supply unit is lost, blocks electrical current flow from said first energy storer toward said voltage converter, or toward said supply unit.
5. The field device as claimed in claim 1, wherein:
   said circuit detection is so designed, that, on the one hand, it produces an at least approximately constant voltage drop and, on the other hand, suppresses electrical current flow toward said supply unit.
6. The field device as claimed in claim 1, wherein:
   said detection circuit comprises at least one diode or a number of diodes connected in series.
7. The field device as claimed in claim 1, wherein:
   said circuit detection comprises a series circuit of a diode in flow direction and a Zener diode in blocking direction.
8. The field device as claimed in claim 3, wherein:
   said detection circuit comprises a second energy storer connected in parallel, which, in the normal case, is charged to a predetermined potential, wherein the pre- determined potential is less than a potential lying on the input of said detection circuit by the voltage drop of said detection circuit.

9. The field device as claimed in claim 8, wherein:
parallel to said second energy storer, a resistor is connected, which is so dimensioned that, in the case of failure of said supply unit, self discharging of said second energy storer occurs more quickly.

10. The field device as claimed in claim 1, wherein:
said detection circuit includes a switch element arranged in series, which is so operated that, in the case of failure of said energy supply unit, it automatically sends a signal to said at least one microcontroller, which tells said at least one microcontroller of the failure of said supply unit.

11. The field device as claimed in claim 10, wherein:
said switch element comprises a transistor with gate (G), drain (D) and source (S);
said transistor, in the normal case, blocks electrical current, when, thus, there lies on the gate (G) the potential (A) and on the source (S) the potential (B) and potential (A) is greater than potential (B).

12. The field device as claimed in claim 10, wherein:
said switch element, or the transistor, becomes conductive and tells said at least one microcontroller via a detection signal of the failure of said supply unit, as soon as, as a result of the failure of said supply unit, the potential (A) on the gate (G) becomes smaller than the potential (B) on the source (S).

13. The field device as claimed in claim 10, wherein:
said transistor comprises a field effect transistor or a bipolar transistor.

14. The field device as claimed in claim 10, wherein:
in series with the drain (D) of said transistor, a Zener diode is connected to ground, in order to reduce the detection signal, which is sent to said at least one microcontroller, to a limit value within the specification of said at least one microcontroller.

* * * * *